(12) United States Patent
Fujiwaka

(10) Patent No.: US 11,869,217 B2
(45) Date of Patent: Jan. 9, 2024

(54) IMAGE PROCESSING APPARATUS, DETECTION METHOD, AND NON-TRANSITORY COMPUTER READABLE MEDIUM

(71) Applicant: NEC Corporation, Tokyo (JP)

(72) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 333 days.

(21) Appl. No.: 17/166,338

(22) Filed: Feb. 3, 2021

(65) Prior Publication Data

US 2021/0248778 A1  Aug. 12, 2021

(30) Foreign Application Priority Data

Feb. 6, 2020 (JP) ................. 2020-018551

(51) Int. Cl.
*G06T 7/73* (2017.01)
*G06N 3/08* (2023.01)

(52) U.S. Cl.
CPC ................. *G06T 7/75* (2017.01); *G06N 3/08* (2013.01); *G06T 2207/20081* (2013.01)

(58) Field of Classification Search
CPC .......... G06N 3/045; G06N 20/00; G06N 3/08; G06N 20/20; G06N 3/084; G06N 20/10; G06N 3/006; G06N 3/088; G06N 5/025; G06N 3/04; G06N 7/01; G06N 3/082; G06N 5/01; G06N 3/02; G06N 3/044; G06N 3/0464; G06N 3/047; G06N 3/049; G06N 3/09; G06N 5/04; G06T 2207/20081

USPC ......................................... 382/103
See application file for complete search history.

(56) References Cited

U.S. PATENT DOCUMENTS

2017/0091944 A1* 3/2017 Taguchi .................... G06T 7/73
2021/0182596 A1* 6/2021 Adams ................ G06V 20/588

OTHER PUBLICATIONS

Huizi Mao, Xiaodong Yang, William J. Dally, "A Delay Metric for Video Object Detection: What Average Precision Fails to Tell", Nov. 6, 2019, pp. 573-582.
Huizi Mao, Taeyoung Kong, William J. Dally, "CATDET: Cascaded Tracked Detector for Efficient Object Detection From Video", Feb. 19, 2019.

* cited by examiner

*Primary Examiner* — Ajibola A Akinyemi
(74) *Attorney, Agent, or Firm* — Sughrue Mion, PLLC

(57) ABSTRACT

An image processing apparatus 10 includes a learning model construction unit 11 that generates a divided space(s) obtained by dividing a target space into one or more spaces and constructs a learning model for recognizing an object(s) included in the divided space, a learning model management unit 12 that manages the learning model and a region forming the divided space including the object recognized by the learning model in association with each other, a space estimation unit 13 that estimates a region forming a camera recognition space captured by a camera provided in a UI device; and a detection unit 14 that selects, from among the managed learning models, a specific learning model associated with the region forming the divided space including the estimated region forming the camera recognition space, and to detect the object included in a space displayed on the UI device using the selected specific learning model.

5 Claims, 17 Drawing Sheets

IMAGE PROCESSING APPARATUS, DETECTION METHOD, AND NON-TRANSITORY COMPUTER READABLE MEDIUM

INCORPORATION BY REFERENCE

This application is based upon and claims the benefit of priority from Japanese patent application No. 2020-018551, filed on Feb. 6, 2020, the disclosure of which is incorporated herein in its entirety by reference.

TECHNICAL FIELD

The present disclosure relates to an image processing apparatus, a detection method, and a program.

BACKGROUND ART

By using Augmented Reality (AR), it is possible to support work by overlaying detailed information of a place or an object on the place or the object as a virtual object. In order to effectively support work, it is important to reduce the time required to present information about the AR as much as possible.

A method using a video recognition technique is sometimes used to display the AR. Specifically, a service provider using the AR photographs a position where the AR is to be displayed in advance using a camera or the like mounted on a terminal such as a smartphone or AR glasses, and registers feature points of an object for displaying an virtual object using the AR in a video analysis device or the like. After that, when the feature points of a video displayed on a User Interface (UI) device such as a headset or AR glasses capable of displaying the AR match the feature points of the object, the UI device displays a display manner in which the virtual object is overlaid on the video.

Non Patent Literature 1 and 2 disclose processing for predicting a position of an object in the next frame from a result of an analysis on the previous frame among plurality of video frames which are in a time-series relation (such a video frame will be hereinafter referred to simply as a "frame"), thereby preventing rescanning of the entire image and reducing the amount of calculation for displaying the AR.

Non Patent Literature 1: Huizi Mao, Xiaodong Yang, William J. Dally, "A Delay Metric for Video Object Detection: What Average Precision Fails to Tell", Nov. 6, 2019

Non Patent Literature 2: Huizi Mao, Taeyoung Kong, William J. Dally, "CATDET: CASCADED TRACKED DETECTOR FOR EFFICIENT OBJECT DETECTION FROM VIDEO", Feb. 19, 2019

SUMMARY

However, even when the processing for reducing the calculation amount disclosed in Non Patent Literature 1 and 2 is executed, if the video quality of a frame is poor, more frames are required in order to recognize an object included in the frame as compared with when the image quality of the frame is satisfactory. As a result, there is a problem that as the video quality of the frame deteriorates, it takes more time to recognize an object for displaying the AR.

An object of the present disclosure is to provide an image processing apparatus, a detection method, and a program which can reduce the time required for recognizing an object for displaying AR.

A first example aspect of the present disclosure is an image processing apparatus including: a learning model construction unit configured to generate one or more divided spaces obtained by dividing a target space into one or more spaces and to construct a learning model for recognizing one or more objects included in the divided space; a learning model management unit configured to manage the learning model and a region forming the divided space including the object recognized by the learning model in association with each other; a space estimation unit configured to estimate a region forming a camera recognition space captured by a camera provided in a User Interface (UI) device; and a detection unit configured to select, from among the learning models managed by the learning model management unit, a specific learning model associated with the region forming the divided space including the estimated region forming the camera recognition space, and to detect the object included in a space displayed on the UI device using the selected specific learning model.

A second example aspect of the present disclosure is a detection method including: generating one or more divided spaces obtained by dividing a target space into one or more spaces and constructing a learning model for recognizing one or more objects included in the divided space; managing the learning model and a region forming the divided space including the object recognized by the learning model in association with each other; estimating a region of a camera recognition space captured by a camera provided in a UI device; and selecting, from among the learning models managed by the learning model management unit, a specific learning model associated with the region forming the divided space including the estimated region forming the camera recognition space, and detecting the object included in a space displayed on the UI device using the selected specific learning model.

A third example aspect of the present disclosure is a program causing a computer to execute: generating one or more divided spaces obtained by dividing a target space into one or more spaces and constructing a learning model for recognizing one or more objects included in the divided space; managing the learning model and a region forming the divided space including the object recognized by the learning model in association with each other; estimating a region forming a camera recognition space captured by a camera provided in a UI device; and selecting, from among the learning models managed by the learning model management unit, a specific learning model associated with the region forming the divided space including the estimated region forming the camera recognition space, and detecting the object included in a space displayed on the UI device using the selected specific learning model.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EMBODIMENTS

First Example Embodiment

Figure 1:
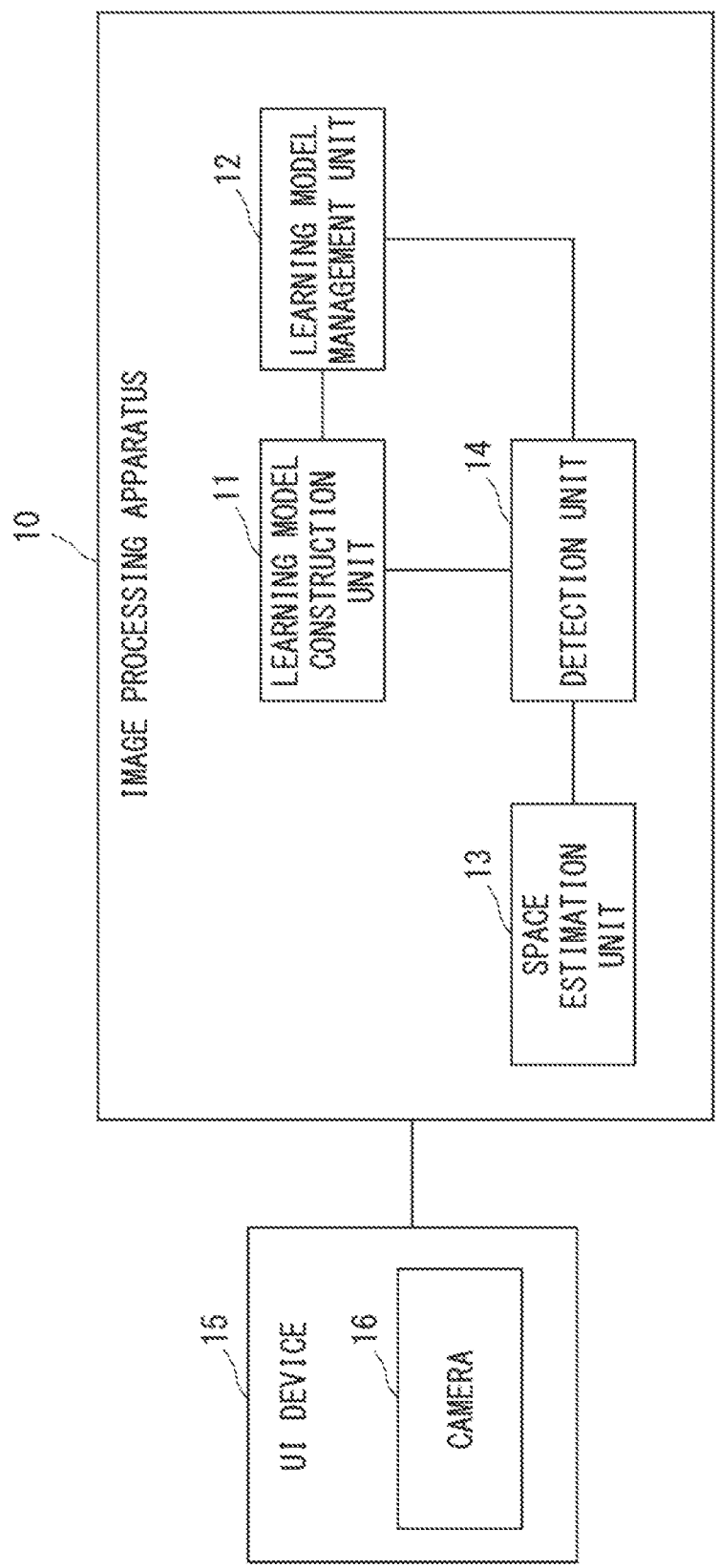
FIG. 1 is a block diagram of an image processing apparatus according to a first example embodiment of the present disclosure.

Example embodiments of the present disclosure will be described below with reference to the drawings. A configuration example of an image processing apparatus 10 according to a first embodiment will be described with reference to FIG. 1. The image processing apparatus 10 may be a computer device operated by a processor executing a program stored in a memory. The image processing apparatus 10 may be, for example, a server device.

The image processing apparatus 10 includes a learning model construction unit 11, a learning model management unit 12, a space estimation unit 13, and a detection unit 14. The components of the image processing apparatus 10, such as the learning model construction unit 11, the learning model management unit 12, the space estimation unit 13, and the detection unit 14, may be software or modules in which processing is executed by the processor executing a program stored in the memory. Alternatively, the components of the image processing apparatus 10 may be hardware such as a circuit or a chip.

The learning model construction unit 11 generates a divided space(s) obtained by dividing an target space of AR into one or more spaces, and constructs a learning model for recognizing at least one or more objects included in the divided space(s) to which a virtual object is added by the AR.

The target space may be, for example, a space having a specific region distinguished from an external region, such as a space inside a factory, a store, or a living room. The divided space is a space divided by applying a specified dividing method. The object to which the virtual object is added by the AR may be, for example, a movable object or structure, or an object or a structure which does not move from a specific place. The object to which the virtual object is added may be a person or an animal. The learning model uses video data of the object as correct answer data or training data, and is used for recognizing the object from the video data including the object. The training data may be referred to teaching data or teacher data.

The learning model construction unit 11 constructs the learning model for each divided space when a plurality of divided spaces are present. That is, each learning model is used to recognize the object included in the divided space.

The learning model management unit 12 manages the learning model and a region of the divided space including the object recognized in the learning model in association with each other. The learning model management unit 12 manages each learning model constructed for each divided space in association with the divided space.

The space estimation unit 13 estimates the region formed by a camera recognition space captured (i.e., photographed) by a camera 16 mounted on a UI device 15. The UI device 15 displays a video in which a virtual object is added to the object. The UI device 15 for displaying the video in which the virtual object is added to the object can be regarded as an image processing apparatus capable of displaying the virtual object in a display manner in which the virtual object is overlaid on the video as supplementary information of the object when the object is recognized. The UI device 15 may be, for example, a smartphone terminal or a tablet-type terminal, or may be smart glasses or AR glasses. As shown in FIG. 1, when the UI device 15 is a device different from the image processing apparatus 10, the UI device 15 may transmit the video to the image processing apparatus 10 by radio communication, fixed communication, or the like. Alternatively, the UI device 15 may be included in the image processing apparatus 10 as an apparatus integrated with the image processing apparatus 10 or externally attached to the image processing apparatus 10. Such variations in the configuration of the UI device 15 and the image processing apparatus 10 are applied to other example embodiments described later in a manner similar to this example embodiment.

The detection unit 14 selects the learning model associated with the region of the divided space including the estimated region of the camera recognition space, and detects the object included in the space displayed on the UI device 15. In the region of the camera recognition space included in the divided space, for example, all the regions of the camera recognition space may be included in the region of the divided space, or some of the regions of the camera recognition space may be included in the region of the divided space.

As described above, the image processing apparatus 10 can construct the learning model used for recognizing the object present in the divided space obtained by dividing the target space. Such a learning model is more accurate than that of the learning model for recognizing all objects included in the target space and does not require many video frames for recognition as compared with the learning model for recognizing all objects included in the target space. Therefore, the learning model generated in the image processing apparatus 10 can recognize the object in a short time as compared with the learning model for recognizing all objects included in the target space. For this reason, for example, the UI device 15 including the image processing apparatus 10 can quickly display the AR appropriate for the object by using the recognition result based on the learning model generated in the image processing apparatus 10.

Further, the image processing apparatus 10 can select the learning model for detecting the object by estimating the camera recognition space captured by the camera 16 mounted on the UI device 15 for displaying the video to which the virtual object is added. Thus, the image processing apparatus 10 can appropriately select the learning model necessary for recognizing the object in the camera recognition space captured by the camera 16. As a result, the image processing apparatus 10 can provide the video in which the virtual object is added to the object in a short time.

Second Example Embodiment

Figure 2:
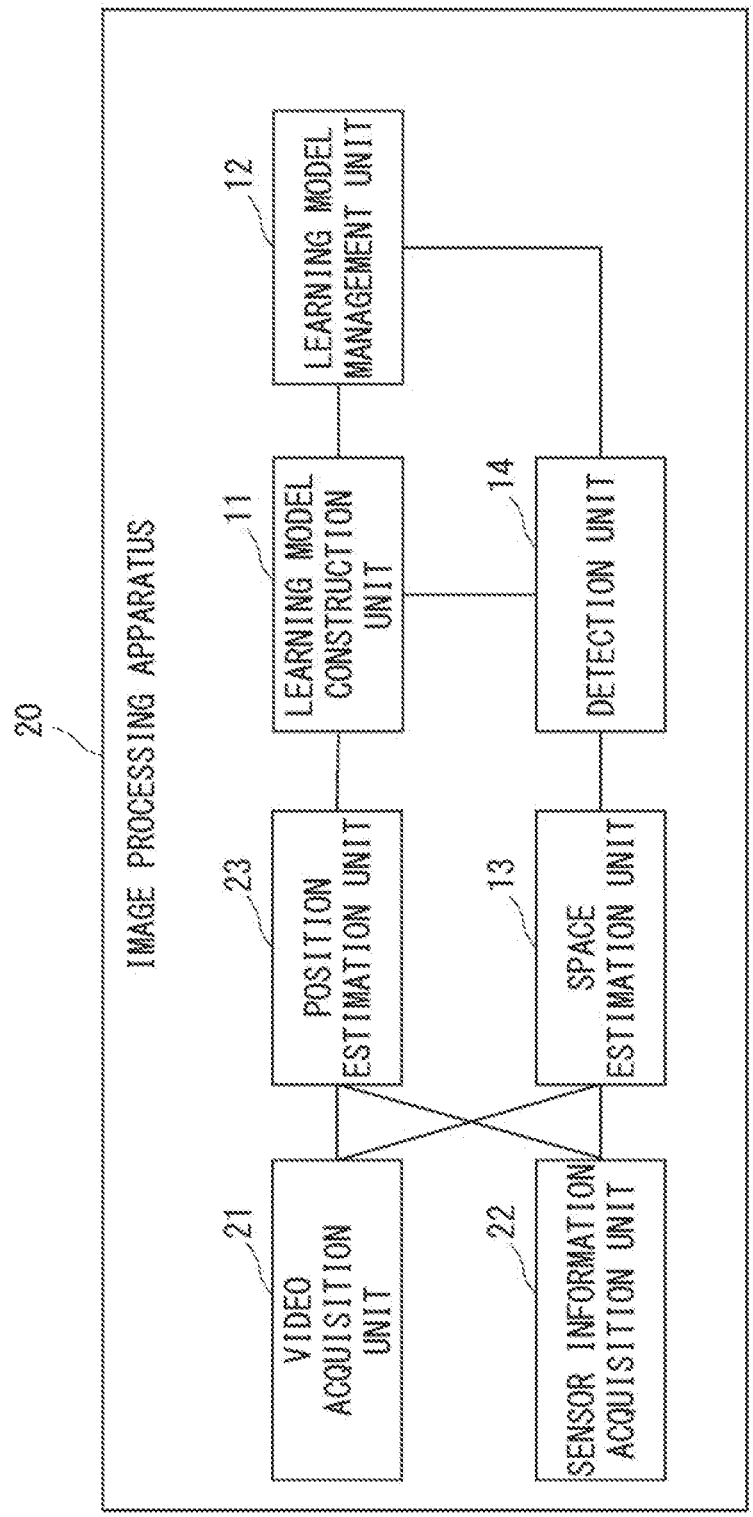
FIG. 2 is a block diagram of an image processing apparatus according to a second example embodiment of the present disclosure.

Next, a configuration example of an image processing apparatus 20 according to a second example embodiment will be described with reference to FIG. 2. The image processing apparatus 20 has a configuration in which the image processing apparatus 10 of FIG. 1 further includes a video acquisition unit 21, a sensor information acquisition unit 22, and a position estimation unit 23. Hereinafter, the configuration of the image processing apparatus 20 different from that of the image processing apparatus 10 will be mainly described.

The video acquisition unit 21 may be, for example, a camera that is an imaging apparatus. The video acquisition unit 21 acquires a video frame in which an entire target space of AR is displayed. The video acquisition unit 21 further acquires a video frame that mainly displays an object to which the virtual object is added by the AR. The video frame which mainly displays the object to which the virtual object is added by the AR may be, for example, a video frame including the object to which the virtual object is added by the AR and the background around the object. The video frame which mainly displays the object to which the virtual object is added by the AR may be a video frame including only one object to which the virtual object is added by the AR.

The sensor information acquisition unit 22 includes a depth sensor for detecting a depth, an acceleration sensor for detecting an acceleration, and an angular velocity sensor for detecting an angular velocity. Alternatively, the sensor information acquisition unit 22 may be a depth sensor or an Inertial Measurement Unit (IMU) sensor for detecting acceleration and angular velocity.

The position estimation unit 23 estimates the position of the object to which the virtual object is added by the AR in the target space of the AR using the video frame received from the video acquisition unit 21. The target space of the AR and the position of the object to which the virtual object is added by the AR may be indicated using three-dimensional coordinates in the same three-dimensional space.

For example, the position estimation unit 23 may estimate the position of the image processing apparatus 20 using the sensors and video frames and also estimate the position of the object by executing Simultaneous Localization and Mapping (SLAM) for creating an environment map of the surroundings.

Alternatively, the position estimation unit 23 may estimate the position of the object by combining the video frames and sensor information acquired from the sensor information acquisition unit 22. For example, the position estimation unit 23 may improve the estimation accuracy by combining the position of the object estimated using the video frames and the position from the camera to the object estimated using the sensor information.

The learning model construction unit 11 divides the target space to generate a divided space(s). For example, the learning model construction unit 11 generates a divided space(s) according to a predetermined division number D1 (D1 is an integer equal to or greater than 1). In other words, the learning model construction unit 11 generates D1 divided spaces. For example, the learning model construction unit 11 may divide the target space into grids. Alternatively, the learning model construction unit 11 may generate the divided space(s) so that the object is not divided into a plurality of divided spaces. Further, the respective divided spaces may have regions overlapping each other. That is, the divided spaces may overlap each other. The divided space may include one object or two or more objects.

The learning model construction unit 11 constructs the learning model for recognizing the object included in the divided space. For example, the learning model construction unit 11 uses the video frame which mainly displays the object received from the video acquisition unit 21 as the correct answer data and training data to construct the learning model for recognizing the object. Further, the learning model construction unit 11 may use a video frame which displays the entire target space or a video frame which displays the background of the object in order to learn the background of each divided space.

The learning model construction unit 11 may specify the object included in each of the divided spaces using position information of the object estimated by the position estimation unit 23. For example, the learning model construction unit 11 may determine that an object A is included in a divided space A including the estimated position of the object A. Alternatively, the learning model construction unit 11 does not need to use the position information of the object. For example, the administrator or the like of the image processing apparatus 20 may recognize the object A included in the divided space A, and input the video frame on which the object A is projected to the learning model construction unit 11 as the correct answer data for constructing the learning model for the divided space A.

The learning model construction unit 11 does not construct the learning model for the divided space where the object to which the virtual object is added by the AR is not present.

The learning model construction unit 11 may construct the learning model by, for example, executing Convolutional Neural Network (CNN), clustering, or the like, or by using other methods.

The learning model construction unit 11 may generate the divided space(s) according to the division number D1, construct the learning model associated with each divided space, and then generate the divided space(s) again according to a division number D2 which is a value smaller than the division number D1.

Figure 3:
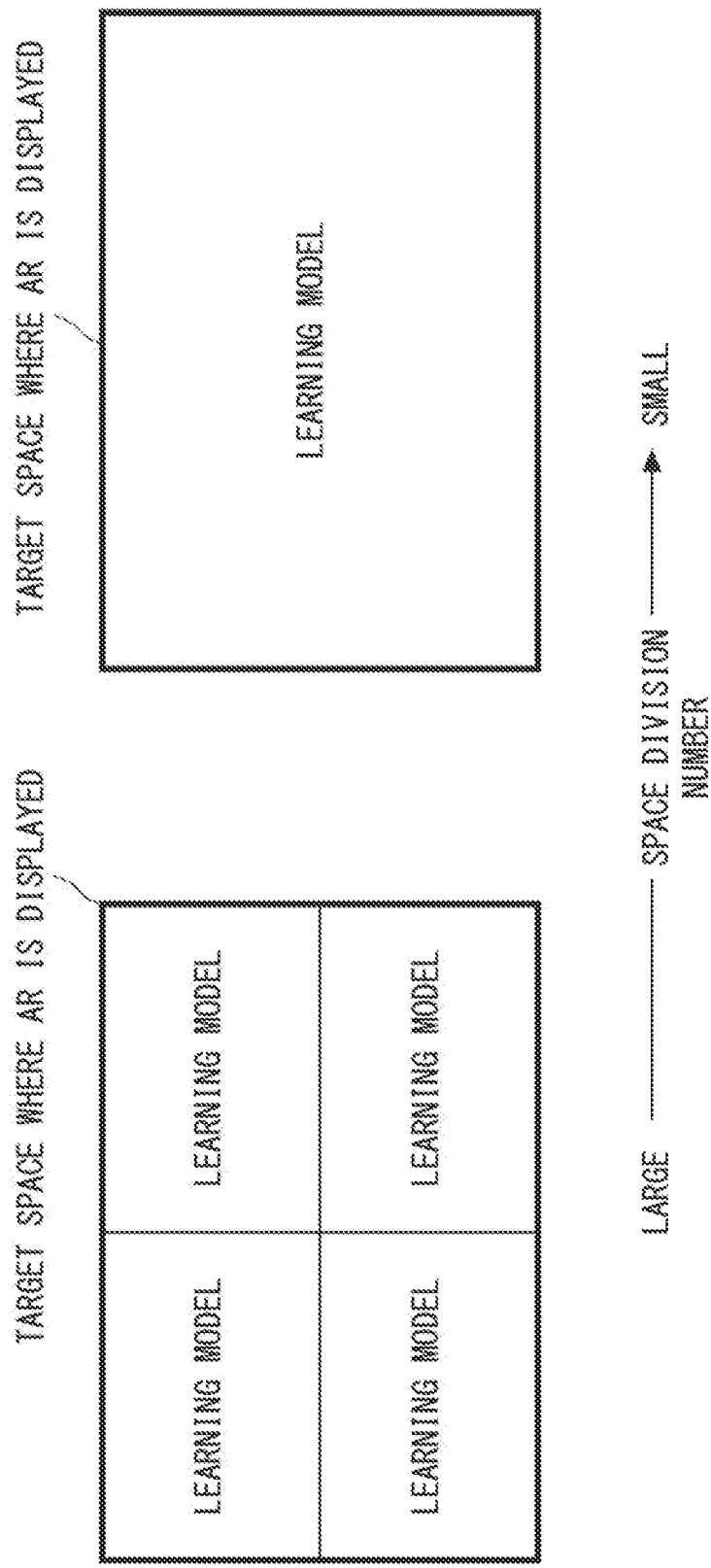
FIG. 3 is a diagram for explaining learning models associated with divided spaces according to the second example embodiment.

FIG. 3 is a diagram showing divided spaces and learning models associated with the respective divided spaces. The diagram on the left side of FIG. 3 shows that the target space is divided into four, and the learning model is associated with each of the four divided spaces. The diagram on the right side of FIG. 3 shows that the division number is one, the target space corresponds to the divided space, and only one learning model is present.

The learning model construction unit 11 constructs the learning model for each of the D2 divided spaces. The learning model construction unit 11 repeats division of the target space and construction of the learning model until the division number reaches a defined value while changing the division number. For example, the division number D2 may be defined in such a way that the adjacent divided spaces are coupled to each other for the D1 divided spaces. For example, the division number D2 may be a half of the division number D1, and two adjacent divided spaces may be coupled to each other for the D1 divided spaces. FIG. 3 shows that the defined value of the division number is 1 and the division of the target space is repeated until the division number becomes 1 from 4.

The learning model construction unit 11 records or stores the constructed learning model in the learning model management unit 12 in association with the divided space. Specifically, the learning model construction unit 11 associates the divided space A with the learning model A constructed to recognize the object included in the divided space A.

The processing executed by the position estimation unit 23 and the learning model construction unit 11 is preparation processing executed before the detection of the object, and is processing in a preparation phase. Hereinafter, the space estimation unit 13 and the detection unit 14 which execute processing in an execution phase for detecting the object to which the virtual object is added by the AR will be described.

The space estimation unit 13 receives image data corresponding to the video displayed on a display provided in the UI device 15 (such UI device 15 is hereinafter sometimes referred to as an "AR terminal") for displaying the video to which the virtual object is added by the AR. The video obtained from the AR terminal may be, for example, moving image data. When the video acquisition unit 21 is provided in the AR terminal, the space estimation unit 13 receives the video from the video acquisition unit 21. Alternatively, the space estimation unit 13 may receive the video from the AR terminal different from the video acquisition unit 21. Furthermore, the space estimation unit 13 receives the sensor information such as a depth, an acceleration, and an angular velocity from the sensor information acquisition unit 22.

The space estimation unit 13 estimates the position and inclination of the AR terminal using the video and sensor information, and estimates the space captured by a camera of the AR terminal. The space captured by the camera of the AR terminal may be a space indicated by a video displayed on the display or the like of the AR terminal. The space captured by the AR terminal corresponds to the camera recognition space. The video and sensor information used by the space estimation unit 13 may be referred to as a plurality of video frames, which are still image data, and the sensor information, respectively. The space estimation unit 13 may estimate the camera recognition space by creating an environment map of the surrounding of the AR terminal using the SLAM.

Figure 4:
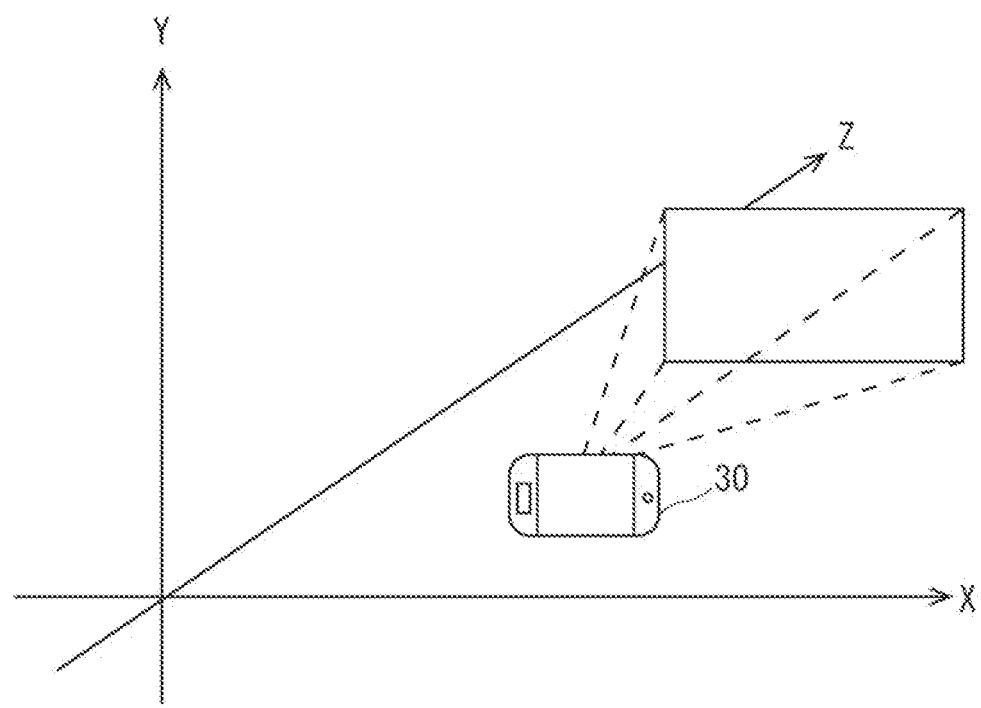
FIG. 4 is a diagram showing a space estimated by a space estimation unit 13 according to the second example embodiment.

Here, the space estimated by the space estimation unit 13 will be described with reference to FIG. 4. FIG. 4 shows a three-dimensional space in which the X, Y, and Z axes are used to specify the position. An AR terminal 30 may be the video acquisition unit 21. The space estimated by the space estimation unit 13 may be a space of a quadrangular pyramid shown in FIG. 4 having the AR terminal 30 as an apex.

The space estimation unit 13 may estimate the space captured by the camera of the AR terminal 30 based on the viewing angle, the angle of view, or the like defined as the specifications of the AR terminal 30. The specifications may be referred to as specs, catalog values, or the like. Further, the space estimation unit 13 may narrow down the estimated region of the camera recognition space by creating the environment map of the surrounding of the AR terminal by executing the SLAM using the viewing angle of the AR terminal 30 and so on.

The detection unit 14 determines whether the region of the camera recognition space estimated by the space estimation unit 13 is included in at least one of the plurality of divided spaces. When the detection unit 14 determines that the region of the camera recognition space is included in one divided space, the detection unit 14 selects the learning model associated with the divided space including the region of the camera recognition space. The detection unit 14 detects the object included in the video of the AR terminal using the selected learning model.

When the detection unit 14 determines that there are a plurality of divided spaces including the region of the camera recognition space, it may select the learning model associated with the divided space that forms a region smaller than a predetermined reference value or threshold. When the detection unit 14 determines that the region of the camera recognition space is included in the plurality of divided spaces, the detection unit 14 may select the learning model associated with the divided space that forms the smallest region. The detection unit 14 detects the object included in the video of the AR terminal using the selected learning model. When there are a plurality of divided spaces including the region of the camera recognition space, for example, the camera recognition space may be included in one divided space among the D1 divided spaces and further included in one divided space among the D2 divided spaces.

The image processing apparatus 20 adds the virtual object previously associated with the object to the object detected by the detection unit 14 and displays them on the AR terminal. For example, the image processing apparatus transmits the video to which the virtual object is added to the AR terminal. Alternatively, the video generated inside the image processing apparatus 20 and to which the virtual object is added are output to the video acquisition unit 21.

Next, a relearning phase in which the learning model construction unit 11 relearns the learning model will be described. For example, when the object to which the virtual object is added by the AR is added, the learning model construction unit 11 relearns the learning model.

In the relearning phase, the position estimation unit 23 estimates the position of the added object in the target space of the AR when it receives the video frame including the added object from the video acquisition unit 21. The learning model construction unit 11 specifies the divided space including the position of the added object. The learning model construction unit 11 discards the learning model associated with the specified divided space and reconstructs the learning model for recognizing the added object for each specified divided space.

The learning model construction unit 11 relearns the learning model also when the environment around the AR terminal changes.

The video acquired by the AR terminal is compared with the video acquired by the video acquisition unit 21 in the preparation phase, and when a difference between feature points of the video acquired by the AR terminal and the feature points of the video acquired by the video acquisition unit 21 is large, the learning model construction unit 11 specifies the divided space including the position of the object included in the video acquired by the AR terminal. The feature points in each of the videos may be feature points in the background other than the object or feature points in the object. The learning model construction unit 11 discards the learning model associated with the specified divided space and reconstructs the learning model for recognizing the object for each specified divided space.

Figure 5:
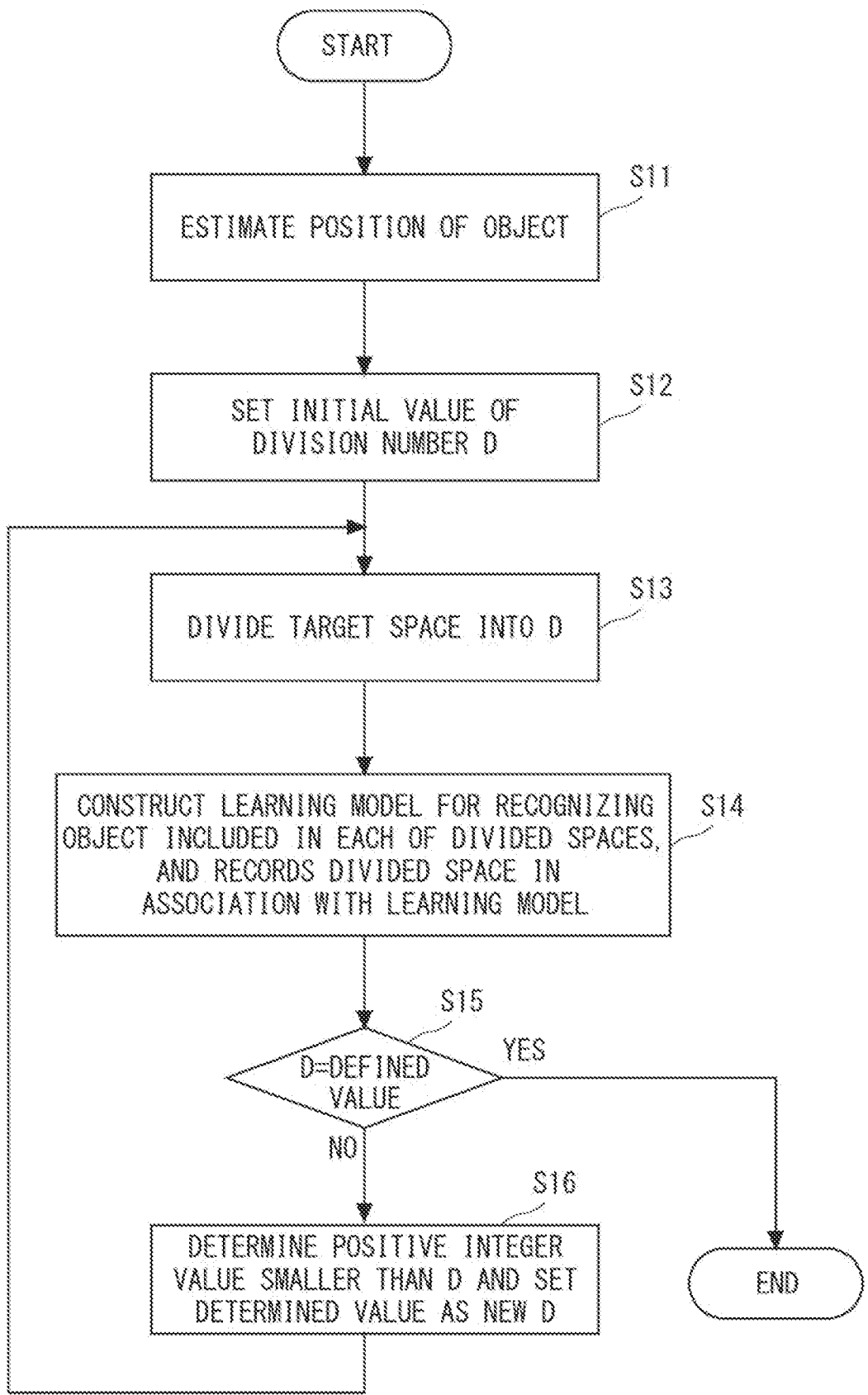
FIG. 5 is a diagram for explaining processing in a preparation phase according to the second example embodiment.

Next, a flow of processing of the preparation phase executed in the image processing apparatus 20 according to the second example embodiment will be described with reference to FIG. 5.

First, the position estimation unit 23 estimates the position of the object to which the virtual object is added by the AR in the target space of the AR using the video frame received from the video acquisition unit 21 (S11). Here, for example, the administrator or the like of the image processing apparatus 20 imparts metadata for specifying an attribute, a name and so on of the object and the position of the object in the video frame to the object to which the virtual object is added by the AR. The metadata may be, for example, the name of an item, the name of an animal, the name of a structure, or the like, or the position of the object in the video frame indicated by XY coordinates of four vertices of a rectangle. The administrator or the like inputs the metadata to the image processing apparatus 20, and the position estimation unit 23 associates the video frame with the estimated position of the object and the metadata.

Next, the learning model construction unit 11 sets an initial value of a division number D of the target space of the AR (S12). When a predetermined value is stored in a memory or the like in the image processing apparatus 20, a predetermined value is set as the initial value. Alternatively, the learning model construction unit 11 may receive an input of the initial value from the administrator or the like of the image processing apparatus 20 when determining the division number D.

Next, the learning model construction unit 11 divides the target space into D divided spaces according to the set division number D (S13). That is, the learning model construction unit 11 generates D divided spaces.

Next, the learning model construction unit 11 constructs the learning model for recognizing the object included in each of the D divided spaces, and records the respective divided spaces in association with the learning models for recognizing the object included in the respective divided spaces (S14). The learning model construction unit 11, for example, associates the divided space with the learning model and records them in the learning model management unit 12. For example, the learning model construction unit 11 inputs the video of the object included in each divided space and the metadata of the object to a learning device, and constructs the learning model for recognizing the object. The learning model construction unit 11 may input the video of the object to the learning device for constructing the learning model for the divided space including the position information of the object.

Next, the learning model construction unit 11 determines whether or not the division number D of the target space is the defined value (S15). For example, when the defined value is 1, the learning model construction unit 11 determines whether or not the division number D is 1. When the division number D is the defined value, the learning model construction unit 11 ends the processing. When the division number D is not the defined value, namely, when the division number D is a value larger than the defined value, the learning model construction unit 11 determines a positive integer value smaller than the current division number D, and sets the determined value as a new division number D (S16). After the processing of Step S16, the learning model construction unit 11 repeats the processing from Step S13.

In Step S15, the positive integer value smaller than the current division number D, which is determined by the learning model construction unit 11, may be predetermined, or a value input from the administrator or the like of the image processing apparatus 20 may be set as the positive integer value smaller than the current division number D.

Figure 6:
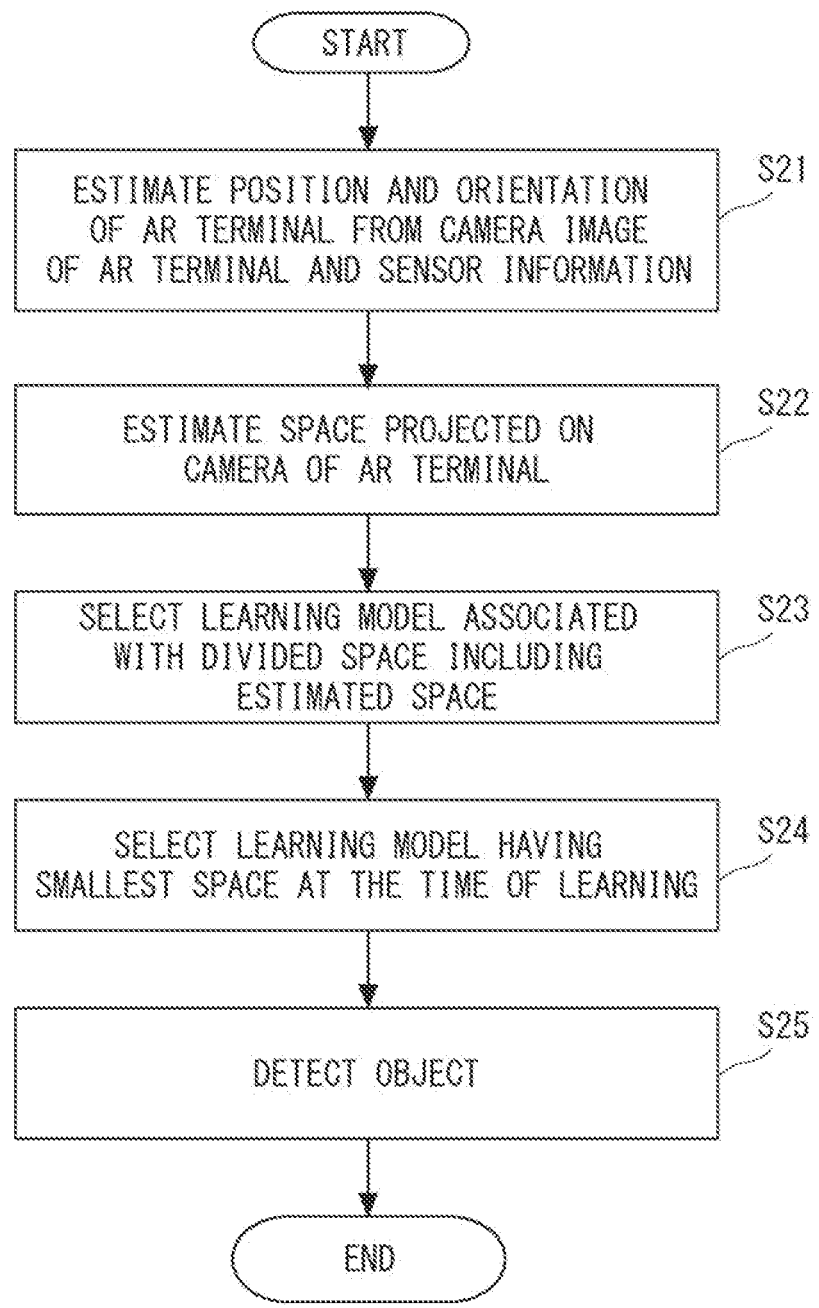
FIG. 6 is a diagram for explaining processing in an execution phase according to the second example embodiment.

Next, a flow of processing of the execution phase executed in the image processing apparatus 20 according to the second example embodiment will be described with reference to FIG. 6.

First, the space estimation unit 13 estimates the position and inclination of the AR terminal using a camera image of the AR terminal and the sensor information received from the sensor information acquisition unit 22 (S21). The camera image may be referred to as a video. Next, the space estimation unit 13 estimates the camera recognition space projected on the camera of the AR terminal (S22). For example, the space estimation unit 13 may estimate the camera recognition space projected on the camera of the AR terminal based on the SLAM that uses a plurality of pieces of still image data and the viewing angle, the angle of view, and so on defined as the specifications of the AR terminal.

Next, the detection unit 14 selects the learning model associated with at least one divided space including the region of the camera recognition space estimated by the space estimation unit 13 (S23). It is assumed here that the region of the camera recognition space is included in a plurality of divided spaces, and the detection unit 14 selects a plurality of learning models. Next, the detection unit 14 selects the learning model associated with the divided space that forms the smallest region (S24).

Next, the detection unit 14 detects the object included in the video of the AR terminal using the selected learning model (S25).

As described above, the image processing apparatus 20 can construct the learning model for detecting the object included in the divided space. The learning model for detecting the object included in the divided space has a smaller area to learn than that of the learning model for detecting the object included in the entire target space. Therefore, the learning model for detecting the object included in the divided space has higher accuracy than that of the learning model for detecting the object included in the entire target space and the number of video frames required for detecting the object can be reduced as compared with that of the learning model for detecting the object included in the entire target space. As a result, the image processing apparatus 20 can shorten the time until the object to which the virtual object is added by the AR is detected compared with the time when the object included in the entire target space is detected.

Further, when the camera recognition space corresponding to the image photographed by the camera provided in the AR terminal is included in the plurality of divided spaces, the image processing apparatus 20 selects the learning model associated with the divided space forming the smallest region. The learning model associated with the divided space forming the smallest region has a smaller area to learn than that of the learning model associated with the divided space forming a large region. Thus, the learning model associated with the divided space forming the smallest region is more accurate than that of the learning model associated with the divided space forming the large region and the number of video frames required for detecting the object can be reduced as compared with the learning model associated with the divided space forming the large region. For this reason, the image processing apparatus 20 can further shorten the time until the object is detected by selecting the learning model associated with the divided space forming the smallest region.

In the second example embodiment, the configuration in which the image processing apparatus 20 includes the learning model construction unit 11, the learning model management unit 12, the space estimation unit 13, the detection unit 14, the video acquisition unit 21, the sensor information acquisition unit 22, and the position estimation unit 23 has been described. However, the AR terminal 30 may include all the components included in the image processing apparatus 20, and the AR terminal 30 may construct the learning model and detect the object using the learning model.

Figure 7:
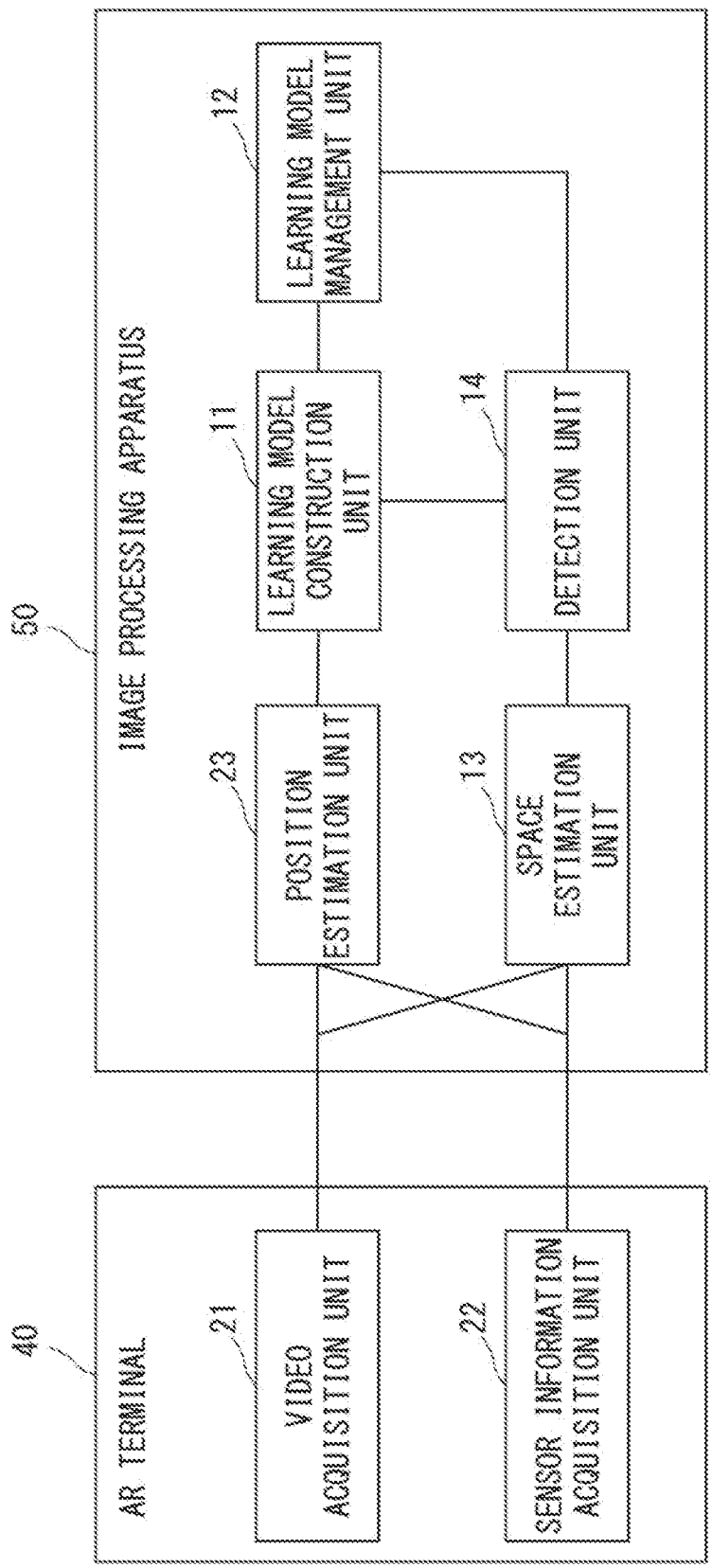
FIG. 7 is a diagram showing a modified example of the image processing apparatus according to the second example embodiment.

Alternatively, the components of the image processing apparatus 20 may be arranged as shown in FIG. 7. FIG. 7 shows a system configuration in which the components of the image processing apparatus 20 are arranged separately between an AR terminal 40 and an image processing apparatus 50. FIG. 7 shows a configuration in which the AR terminal 40 includes the video acquisition unit 21 and the sensor information acquisition unit 22, and the image processing apparatus 50 includes other components.

Figure 8:
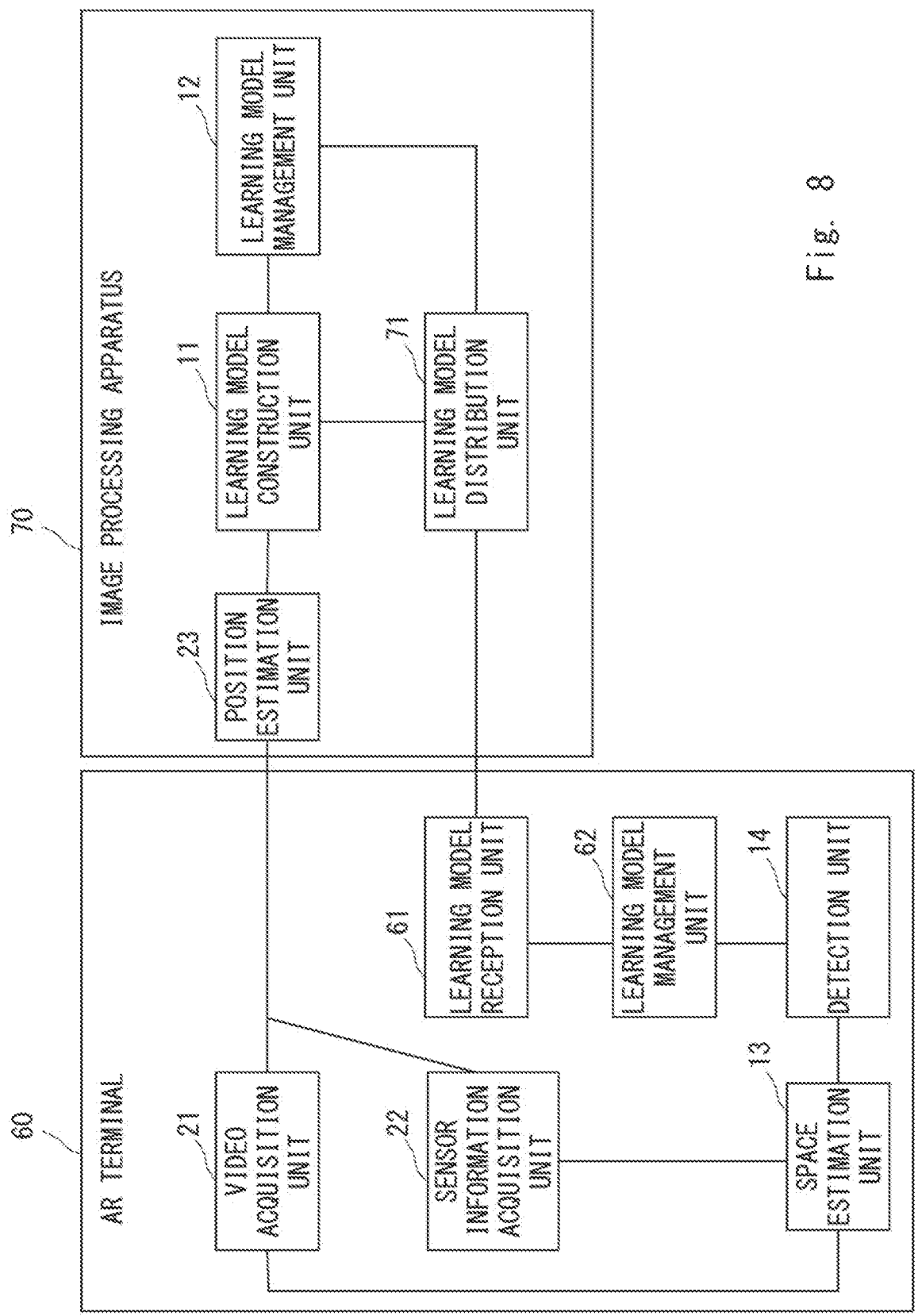
FIG. 8 is a diagram showing a modified example of the image processing apparatus according to the second example embodiment.

Alternatively, the components of the image processing apparatus 20 may be arranged as shown in FIG. 8. FIG. 8 shows that an image processing apparatus 70 executes processing in the preparation phase and distributes the constructed learning model to an AR terminal 71 through a learning model distribution unit 60. Further, FIG. 8 shows that the AR terminal 60 executes the processing in the execution phase. In FIG. 8, a learning model reception unit 61 receives the learning model from the learning model distribution unit 71, and records or stores the received learning model in a learning model management unit 62. Thus, the AR terminal 60 holds the learning model associated with each divided space. The space estimation unit 13 and the detection unit 14 execute processing in the execution phase and detect the object.

Third Example Embodiment

Figure 9:
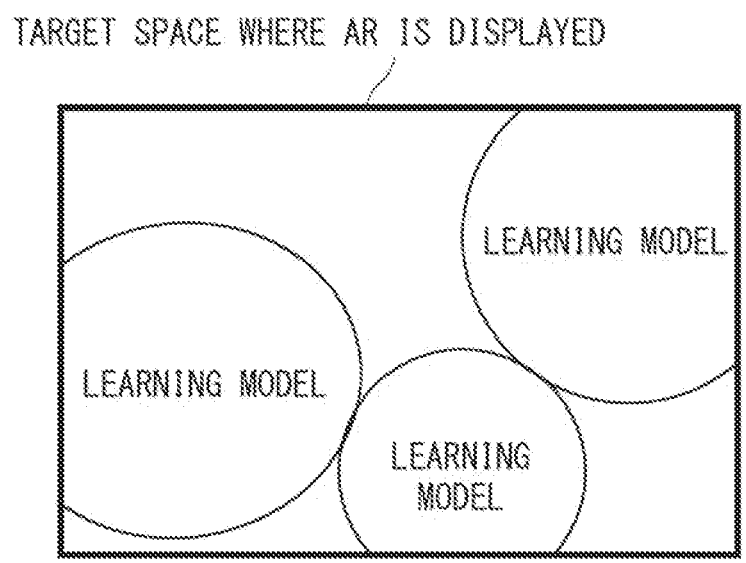
FIG. 9 shows an outline of a learning model according to a third example embodiment.

Next, an outline of a learning model according to the third example embodiment will be described with reference to FIG. 9. FIG. 3 shows that a target space of AR is divided and a learning model is constructed for each divided space. On the other hand, FIG. 9 shows that the learning model is constructed for each object to which a virtual object is added by the AR. The circular regions in FIG. 9 indicate regions where the object is located within the target space. For example, each learning model may be used to detect a single object present within each of the circular regions of FIG. 9, or may be used to detect a set of a plurality of objects.

Figure 10:
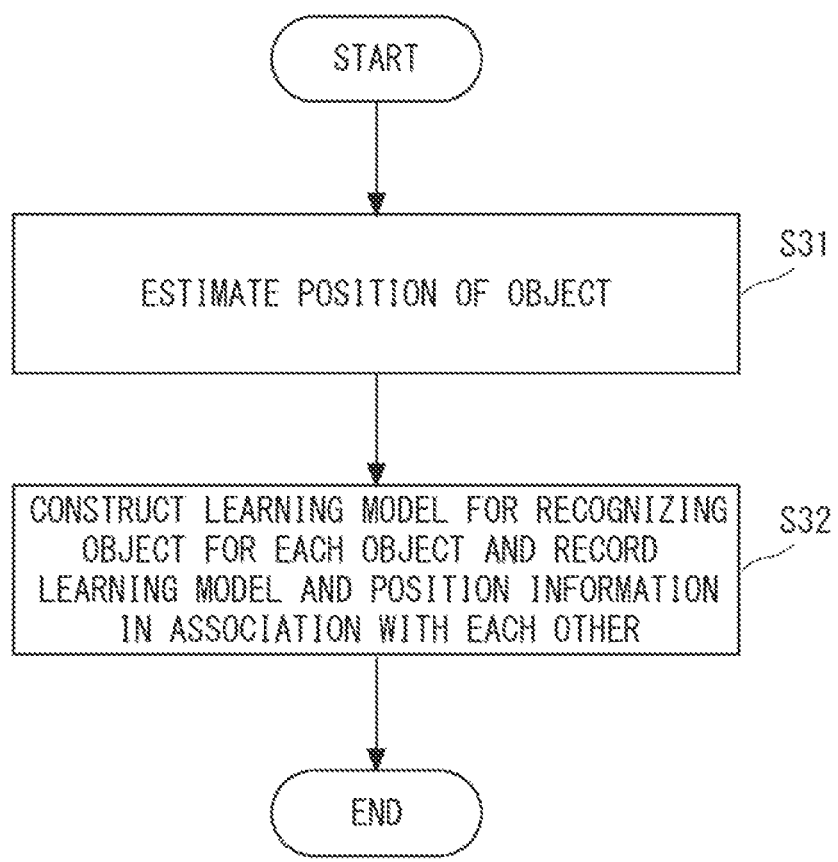
FIG. 10 is a diagram for explaining processing in a preparation phase according to the third example embodiment.
Figure 11:
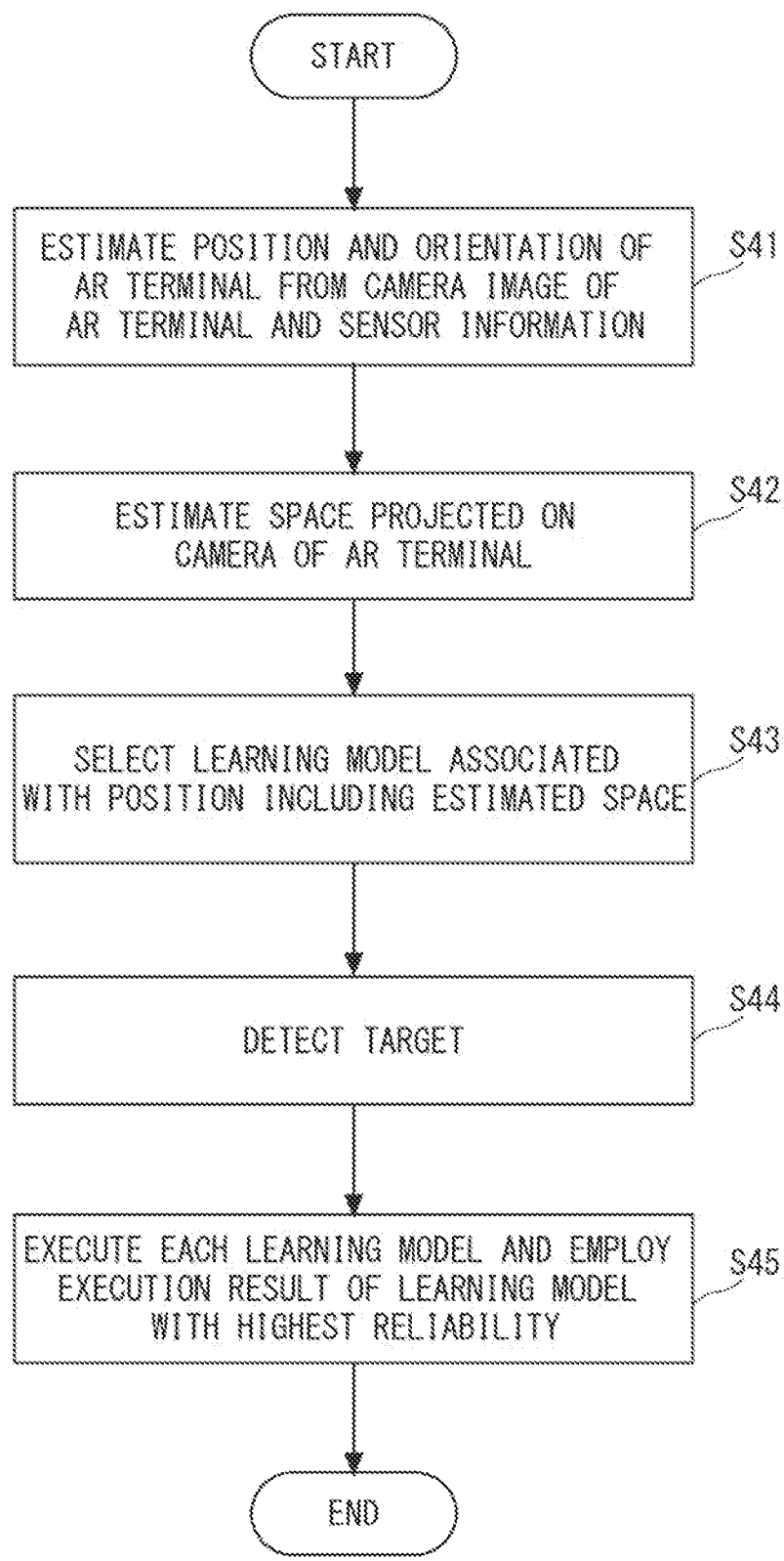
FIG. 11 is a diagram for explaining processing in an execution phase according to the third example embodiment.

Next, a flow of processing of the preparation phase and the execution phase according to the third example embodiment will be described with reference to FIGS. 10 and 11. The preparation phase and the execution phase according to the third example embodiment are executed in an image processing apparatus having the same configuration as that of the image processing apparatus 20 of FIG. 2.

The processing in the preparation phase will be described with reference to FIG. 10. Since Step S31 of FIG. 10 is the same as Step S11 of FIG. 5, a detailed description of Step S31 is omitted.

Next, the learning model construction unit 11 constructs a learning model for recognizing the object whose position is estimated by the position estimation unit 23 (S32). The learning model construction unit 11 constructs the learning model for recognizing each object. The learning model construction unit 11 uses the video frame which mainly displays the object received from the video acquisition unit 21 as the correct answer data and training data to construct the learning model for recognizing the object. Further, the learning model construction unit 11 may learn the video in the vicinity of the object as background information together with the object.

In Step S32, the learning model construction unit 11 associates the constructed learning model with the position of the object recognized by the learning model, and records or stores them in the learning model management unit 12. The position of the object may be, for example, a position indicating any part of the object. For example, the position of the object may be the position of the center of gravity of the object. Alternatively, the position of the object may include a plurality of positions representing any parts of the object.

Next, processing in the execution phase will be described with reference to FIG. 11. Since Steps S41 and S42 in FIG. 11 are the same as Steps S21 and S22 in FIG. 6, respectively, a detailed description of Steps S41 and S42 is omitted.

Next, the detection unit 14 selects the learning model associated with a position included in the region of the camera recognition space estimated by the space estimation unit 13 (S43). When there are a plurality of learning models associated with positions included in the region of the camera recognition space estimated by the space estimation unit 13, the detection unit 14 may select all of the plurality of learning models or any number that is one or more of the learning models.

The detection unit 14 detects the object included in the video of the AR terminal using the selected learning model (S44). The detection unit 14 selects two or more learning models and, when detecting the object using each of the learning models, employs a detection result with high reliability output together with the detection results from the learning models (S45). If the reliability is represented by a numerical value, the detection unit 14 may employ the detection result of the learning model having the numerical value of the reliability equal to or higher than a threshold. Alternatively, the detection unit 14 may employ the detection result having reliability equal to or higher than the threshold when detecting the object using each of the learning models.

When two or more learning models are selected, the detection unit 14 may execute the learning models in order so as to detect the object included in the video of the AR terminal. Alternatively, when two or more learning models are selected, the detection unit 14 may execute the learning models in parallel so as to detect the object included in the video of the AR terminal.

The image processing apparatus 20 adds the virtual object associated in advance with the object to the object selected by the detection unit 14 and displays the virtual object on the AR terminal. For example, the image processing apparatus 20 transmits the video to which the virtual object is added to the AR terminal. Alternatively, the video generated in the image processing apparatus 20 and to which the virtual object is added are output to the video acquisition unit 21.

As described above, in the third example embodiment, the learning model associated with the position included in the camera recognition space, which is the space captured by the camera of the AR terminal, can be selected. The learning model according to the third example embodiment is used to recognize the specific object in the target space. Thus, the detection processing using the learning model used for recognizing the specific object can shorten the processing time as compared with the detection processing using the learning model used for recognizing all objects in the target space. As a result, the image processing apparatus 20 can shorten the time until the object to which the virtual object is added by the AR is detected compared with the time when the object included in the entire target space is detected.

Fourth Example Embodiment

Next, a flow of processing of the preparation phase and the execution phase according to a fourth example embodiment will be described. The preparation phase and the execution phase according to the fourth example embodiment are executed in an image processing apparatus having the same configuration as that of the image processing apparatus 20 of FIG. 2.

Figure 12:
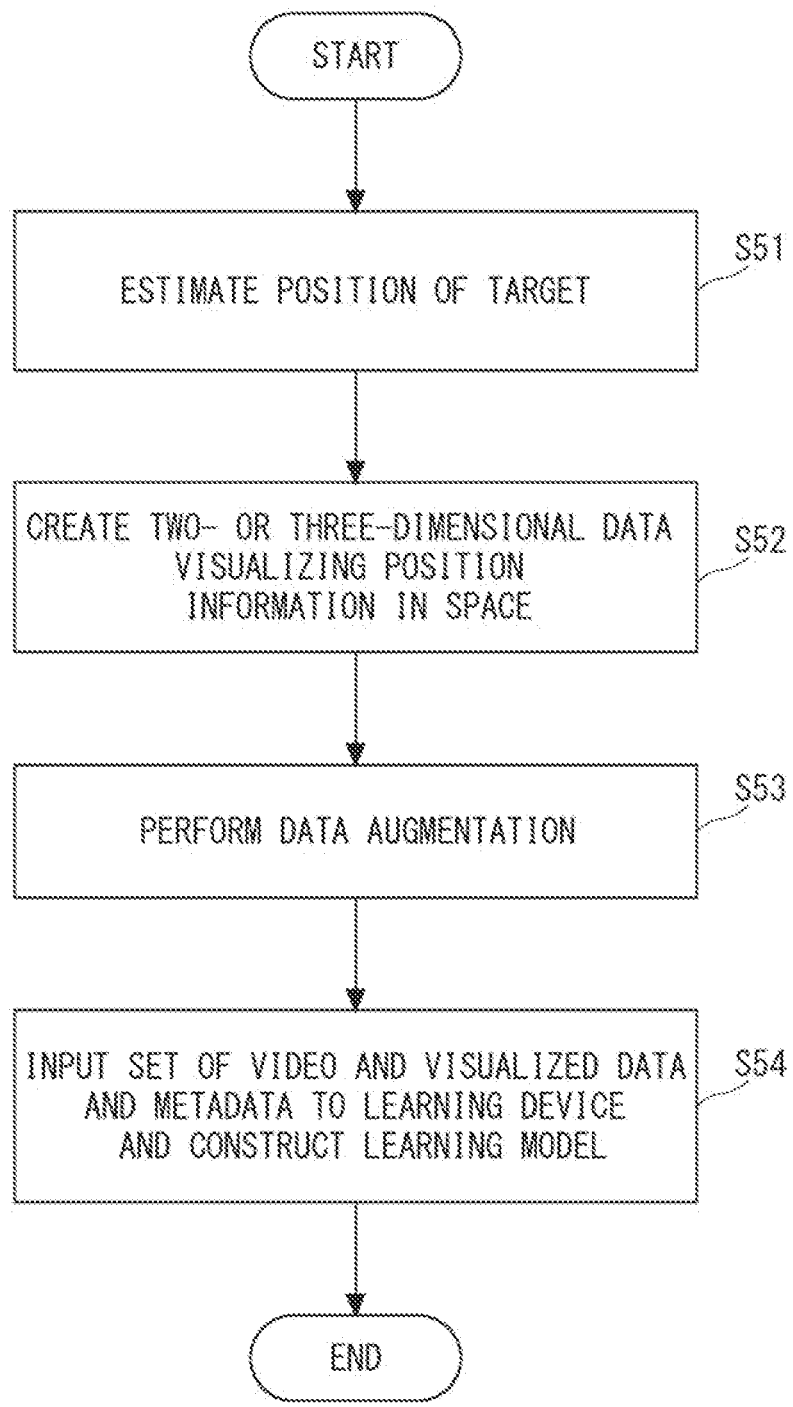
FIG. 12 is a diagram for explaining processing in a preparation phase according to a fourth example embodiment.

The flow of processing of the preparation phase will be described with reference to FIG. 12. Since Step S51 of FIG. 12 is the same as Step S11 of FIG. 5, a detailed description of Step S51 is omitted.

Figure 13:
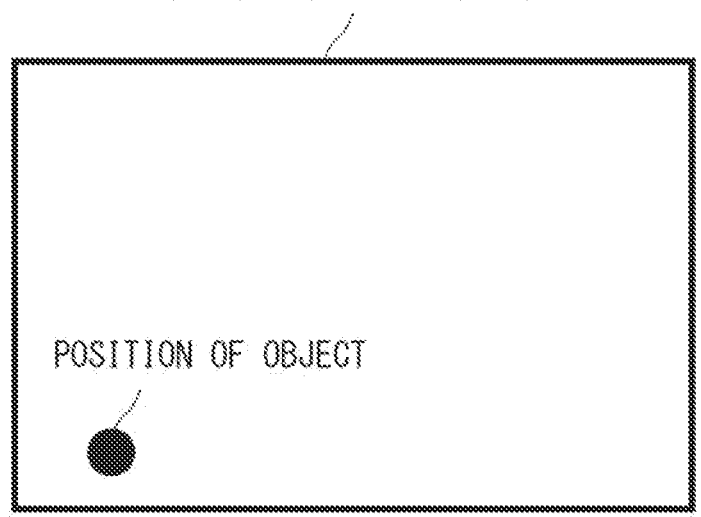
FIG. 13 is a diagram visualizing a position of an object according to the fourth example embodiment.

Next, the position estimation unit 23 creates two- or three-dimensional data that visualizes the position of the object to which the virtual object are added by the AR in the target space of the AR (S52). FIG. 13 shows an example of the two-dimensional data in which the position of the object is visualized. In FIG. 13, the position of the object in the target space is indicated by a black circle.

Figure 14:
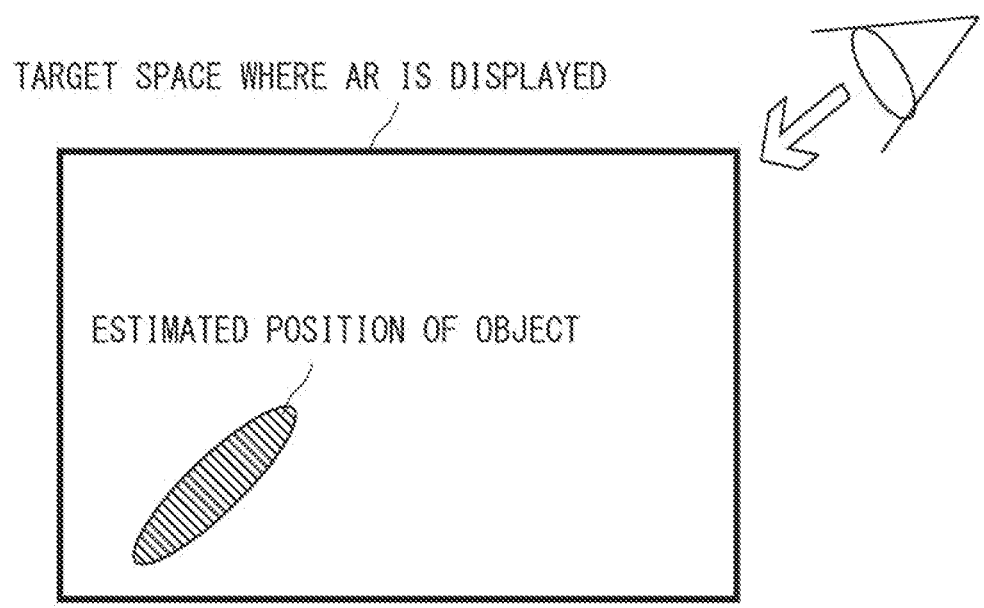
FIG. 14 is a diagram visualizing a position of the object according to the fourth example embodiment.
Figure 15:
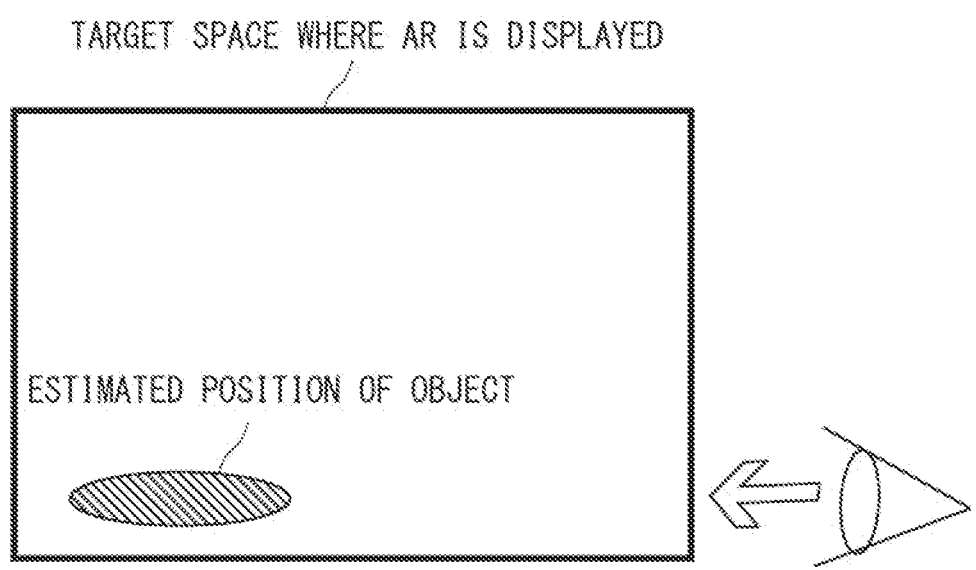
FIG. 15 is a diagram visualizing a position of the object according to the fourth example embodiment.

Next, the position estimation unit 23 performs augmentation on the video of the object to which the virtual object is added by the AR and the visualized data (S53). Specifically, the position estimation unit 23 expands and visualizes the range in which the object may be present in consideration of the possibility that the object may be photographed in various directions or at various distances. For example, FIG. 14 shows a position estimated as a range in which the object is present when the object in the target space is viewed from the upper right direction. FIG. 15 shows a position estimated as a range in which the object is present when the object in the target space is viewed from the lower right direction. The range in which the object is present may expand as the position at which the object is viewed moves away from the object. When the position at which the object is viewed is close to the object, the position of the object can be estimated more accurately than when the position at which the object is viewed is far from the object. Thus, as the position at which the object is viewed moves away from the object, the accuracy of the position of the object decreases, and the range in which the object is present expands.

The position estimation unit 23 estimates the range in which the object is present when the object is viewed from various directions other than the directions shown in FIGS. 14 and 15, and visualizes the estimated range.

Referring back to FIG. 12, the learning model construction unit 11 inputs the set of the video of the object and the visualized data and the metadata of the object to the learning device, and constructs the learning model for recognizing the object and the position of the object (S54).

Figure 16:
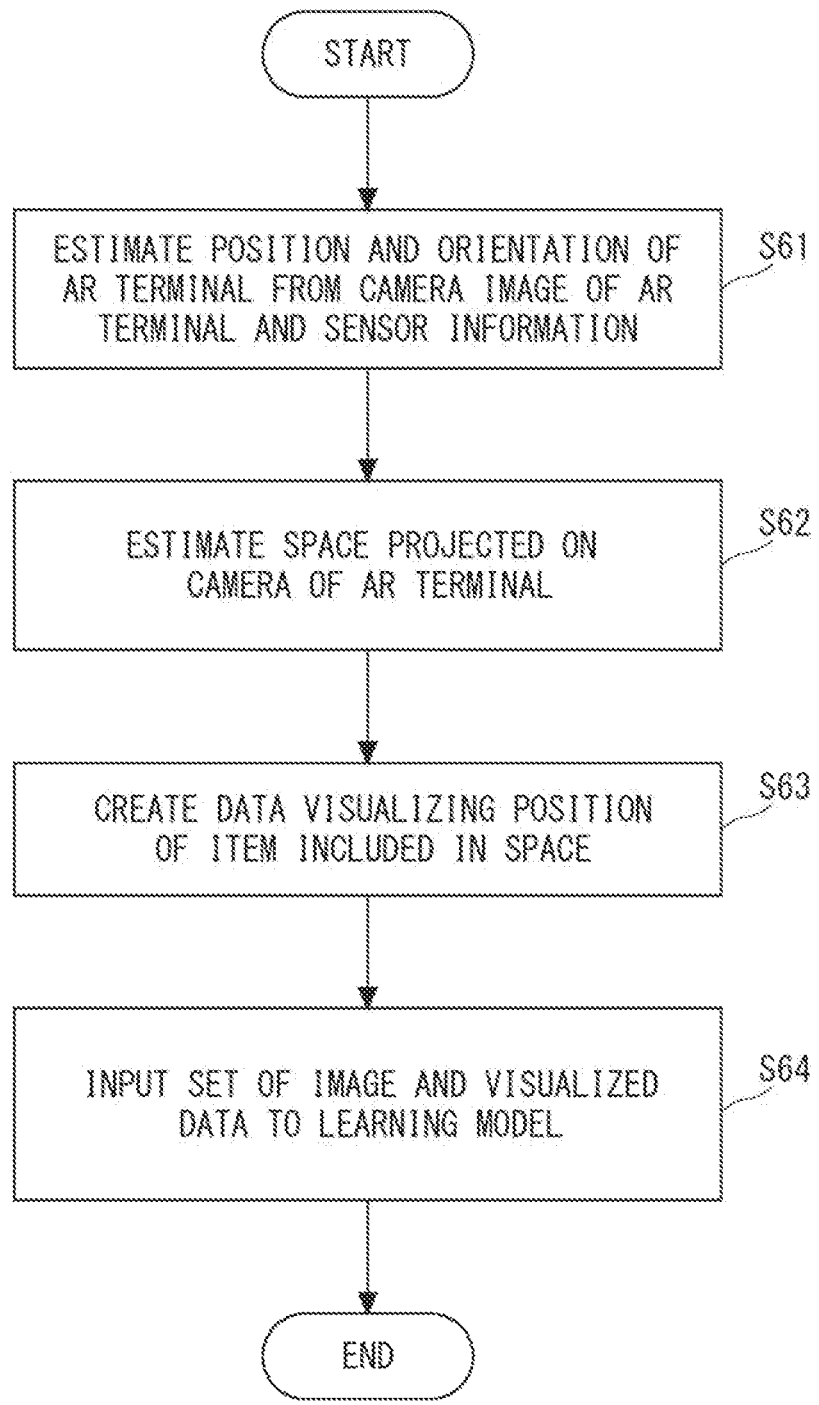
FIG. 16 is a diagram for explaining processing in an execution phase according to the fourth example embodiment.

Next, a flow of processing of the execution phase will be described with reference to FIG. 16. Since Steps S61 and S62 in FIG. 16 are the same as Steps S21 and S22 in FIG. 6, respectively, a detailed description of Steps S61 and S62 is omitted.

Next, the space estimation unit 13 creates data in which the position of the object included in the space is visualized (S63). The items included in the space include objects and non-objects to which the virtual object is added by the AR.

Next, the detection unit 14 inputs, to the learning model, the set of the video of the AR terminal and the data in which the position of the object included in the space of the AR terminal is visualized (S64). In this manner, the detection unit 14 detects the object included in the video of the AR terminal.

As described above, the learning model according to the fourth example embodiment is constructed by inputting the position of the object in the target space together with the video of the object in the preparation phase. Therefore, in the execution phase, the image processing apparatus 20 can detect the object by inputting the position of the visualized object to the learning model together with the video of the AR terminal. That is, the image processing apparatus 20 can detect the object without selecting the learning model.

Fifth Example Embodiment

Next, direction estimation processing executed by the space estimation unit 13 according to a fifth example embodiment will be described. The space estimation unit 13 estimates position and inclination of an AR terminal using the video of the AR terminal and sensor information, and estimates the space captured by the AR terminal. In the fifth example embodiment, the space estimation unit 13 further extracts an object from a video frame of the AR terminal. The extraction of the object may be, for example, specifying the object and a non-object in the frame and specifying a relative position of the object in the frame. The relative position of the extracted object in the frame may be, for example, four vertex coordinates of a rectangle surrounding the object in the frame.

The space estimation unit 13 narrows down the direction or position of the object in the estimated space using information of the relative position of the object in the frame. In other words, the space estimation unit 13 estimates a region of a space in which an object may be present from the relative position of the object in the frame and the estimated region of the camera recognition space.

The detection unit 14 selects the learning model associated with the region or position in the direction narrowed down by the space estimation unit 13.

As described above, when the direction estimation processing according to the fifth example embodiment is performed, the region of the space captured by the AR terminal estimated by the space estimation unit 13 can be further narrowed down. For example, even when two objects having similar features are included in the space captured by the AR terminal estimated by the space estimation unit 13, the two objects having the similar features can be distinguished from each other by narrowing down the region of the space. That is, by performing the direction estimation processing according to the fifth example embodiment, the detection unit 14 can correctly detect two objects having the same features. The direction estimation processing according to the fifth example embodiment may be executed, for example, in Step S23 in the execution phase of FIG. 6, Step S43 in the execution phase of FIG. 11, and Step S63 of FIG. 16.

In each of the above-mentioned example embodiments, the case where the object to which the virtual object is added by the AR is mainly stationary has been described, but each of the example embodiments can also be applied to the case where the object moves.

For example, when the object moves, the area to which the object is moved is designated, and the object is learned when the learning model associated with the area to which the object is moved is constructed. When a moving object is detected, a learning model in which the moving object is learned may be always used.

Figure 17:
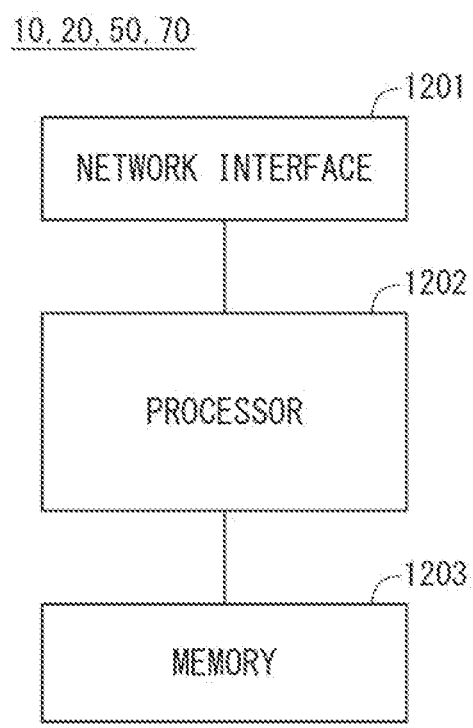
FIG. 17 is a block diagram of an image processing apparatus according to each example embodiment.

FIG. 17 is a block diagram showing a configuration example of the image processing apparatus 10, the image processing apparatus 20, the image processing apparatus 50, and the image processing apparatus 70 (hereinafter referred to as the image processing apparatus 10). Referring to FIG. 17, the image processing apparatus 10 and the like include a network interface 1201, a processor 1202, and a memory 1203. The network interface 1201 is used to communicate with network nodes (e.g., eNB, MME, and P-GW). The network interface 1201 may include, for example, a Network Interface Card (NIC) compliant with IEEE 802.3 series. Here, eNB represents the evolved Node B, MME represents the Mobility Management Entity, and P-GW represents the Packet Data Network Gateway. IEEE stands for Institute of Electrical and Electronics Engineers.

The processor 1202 reads software (computer program) from the memory 1203 and executes it, thereby performing the processing of the image processing apparatus 10 and the like described with reference to the flowcharts in the above-described example embodiment. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage physically separated from the processor 1202. In this case, the processor 1202 may access the memory 1203 via an Input/Output (I/O) interface (not shown).

In the example of FIG. 17, the memory 1203 is used to store software modules. The processor 1202 reads these software modules from the memory 1203 and executes them, so that the processing of the image processing apparatus and the like described in the above example embodiment can be performed.

As described with reference to FIG. 17, each of the processors of the image processing apparatus 10 and the like in the above-described example embodiment executes one or more programs including instructions for causing a computer to perform the algorithm described with reference to the drawings.

In the above example, the program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described example embodiments, and may be modified as appropriate without departing from the spirit of the disclosure.

According to the present disclosure, it is possible to provide an image processing apparatus, a detection method, and a program which can reduce the time required for recognizing an object for displaying AR.

The whole or part of the exemplary embodiments disclosed above can be described as, but not limited to, the following supplementary notes.

(Supplementary Note 1)

An image processing apparatus comprising:

a learning model construction unit configured to generate one or more divided spaces obtained by dividing a target space into one or more spaces and to construct a learning model for recognizing one or more objects included in the divided space;

a learning model management unit configured to manage the learning model and a region forming the divided space including the object recognized by the learning model in association with each other;

a space estimation unit configured to estimate a region forming a camera recognition space captured by a camera provided in a User Interface (UI) device; and a detection unit configured to select, from among the learning models managed by the learning model management unit, a specific learning model associated with the region forming the divided space including the estimated region forming the camera recognition space, and to detect the object included in a space displayed on the UI device using the selected specific learning model.

(Supplementary Note 2)

The image processing apparatus according to Supplementary note 1, wherein the learning model construction unit is configured to specify the divided space including the object using position information of the object.

(Supplementary Note 3)

The image processing apparatus according to Supplementary note 1 or 2, wherein the learning model construction unit is configured to divide the target space into N (N is an integer of one or greater), construct the learning model for recognizing the object included in the N divided spaces, and then divide the target space into M (M is an integer of one or greater and smaller than N), and construct the learning model for recognizing the object included in the M divided spaces.

(Supplementary Note 4)

The image processing apparatus according to Supplementary note 3, wherein when there are a plurality of the divided spaces including the estimated region, the detection unit is configured to select the divided space whose region forming the divided space is smaller than a predetermined reference value.

(Supplementary Note 5)

The image processing apparatus according to Supplementary note 3 or 4, wherein when there are a plurality of the divided spaces including the estimated region, the detection unit is configured to select the divided space whose region is the smallest.

(Supplementary Note 6)

The image processing apparatus according to any one of Supplementary notes 1 to 5, wherein the space estimation unit is configured to estimate a region forming a space photographed by the camera using information about an acceleration and an inclination of the camera detected by a sensor.

(Supplementary Note 7)

An image processing apparatus comprising:

a position estimation unit configured to estimate a position of an object in a target space using a video including the object;

a learning model construction unit configured to construct a learning model for recognizing the object;

a learning model management unit configured to manage the learning model, the object recognized in the learning model, and the estimated position of the object in association with each other;

a space estimation unit configured to estimate a region of a space captured by a camera provided in a UI device; and a detection unit configured to select, from among the learning models managed by the learning model management unit, a specific learning model associated with the position included in the region, and to detect the object included in the region using the selected specific learning model.

(Supplementary Note 8)

The image processing apparatus according to any one of Supplementary notes 1 to 7, wherein the space estimation unit is configured to extract the object from the video of the space displayed on the UI device and to estimate the position at which the object is present within the region of the space using the position of the extracted object in the video and the estimated region of the space.

(Supplementary Note 9)

An image processing apparatus comprising:

a position estimation unit configured to estimate a position of an object in a target space using a video including the object;

a learning model construction unit configured to receive the object and the position of the object and to construct a learning model for recognizing the object; and a detection unit configured to input the video acquired by a camera provided in a UI device and position information of the camera detected by a sensor to the learning model and to detect the object included in the video photographed by the camera.

(Supplementary Note 10)

The image processing apparatus according to Supplementary note 9, further comprising a space estimation unit configured to estimate region of a space captured by the camera provided in the UI device, wherein the space estimation unit is configured to extract the object from the video of the space captured by the camera and to estimate the position at which the object is present in a region forming the space using the position of the object within the region forming the space using the position of the extracted object in the video and the estimated region forming the space.

(Supplementary Note 11)

The image processing apparatus according to any one of Supplementary notes 1 to 8, wherein the space estimation unit is configured to extract the object from the video of the space captured by the camera and to estimate the position at which the object is present in a region forming the space using the position of the object within the region forming the space using the position of the extracted object in the video and the estimated region forming the space.

(Supplementary Note 12)

A detection method comprising:

generating one or more divided spaces obtained by dividing a target space into one or more spaces and constructing a learning model for recognizing one or more objects included in the divided space;

managing the learning model and a region forming the divided space including the object recognized by the learning model in association with each other;

estimating a region of a camera recognition space captured by a camera provided in a UI device; and selecting, from among the learning models managed by the learning model management unit, a specific learning model associated with the region forming the divided space including the estimated region forming the camera recognition space, and detecting the object included in a space displayed on the UI device using the selected specific learning model.

(Supplementary Note 13)

A detection method comprising:

estimating a position of an object in a target space using a video including the object;

constructing a learning model for recognizing the object;

managing the learning model, the object recognized in the learning model, and the estimated position of the object in association with each other;

estimating a region of a space captured by a camera provided in a UI device; and selecting, from among the managed learning models, a specific learning model associated with the position included in the region, and detecting the object included in the region using the selected specific learning model.

(Supplementary Note 14)

A detection method comprising:

estimating a position of an object in a target space using a video including the object;

receiving the object and the position of the object and constructing a learning model for recognizing the object; and inputting the video photographed by a camera provided in a UI device and position information of the camera detected by a sensor to the learning model and detecting the object included in the video displayed on the UI device.

(Supplementary Note 15)

A program causing a computer to execute:

generating one or more divided spaces obtained by dividing a target space into one or more spaces and constructing a learning model for recognizing one or more objects included in the divided space;

managing the learning model and a region forming the divided space including the object recognized by the learning model in association with each other;

estimating a region forming a camera recognition space captured by a camera provided in a UI device; and selecting, from among the learning models managed by the learning model management unit, a specific learning model associated with the region forming the divided space including the estimated region forming the camera recognition space, and detecting the object included in a space displayed on the UI device using the selected specific learning model.

(Supplementary Note 16)

A program causing a computer to execute:

estimating a position of an object in a target space using a video including the object;

constructing a learning model for recognizing the object;

managing the learning model, the object recognized in the learning model, and the estimated position of the object in association with each other;

estimating a region of a space captured by a camera provided in a UI device; and selecting, from among the managed learning models, a specific learning model associated with the position included in the region, and detecting the object included in the region.

(Supplementary Note 17)

A program causing a computer to execute:

estimating a position of an object in a target space using a video including the object;

receiving the object and the position of the object and constructing a learning model for recognizing the object; and inputting the video photographed by a camera provided in a UI device and position information of the camera detected by a sensor to the learning model and detecting the object included in the video photographed by the camera.

What is claimed is:

1. An image processing apparatus comprising:

at least one memory storing instructions, and at least one processor configured to execute the instructions to;

estimate a position of an object in a target space using a video including the object;

construct a plurality of learning models for recognizing the object;

manage a learning model associated with a first region, the object recognized in the learning model, and the estimated position of the object in association with each other;

estimate a second region of a space captured by a camera provided in a UI device;

select, from among the plurality of learning models, a specific learning model associated with the first region that is related to the second region; and detect the object included in the second region using the selected specific learning model.

2. The image processing apparatus according to claim 1, wherein the at least one processor is further configured to execute the instructions to extract the object from the video of the space displayed on the UI device and to estimate the position at which the object is present within the second region of the space using the position of the extracted object in the video and the estimated second region of the space.

3. The image processing apparatus according to claim 1, wherein the at least one processor is further configured to execute the instructions to extract the object from the video of the space captured by the camera and to estimate the position at which the object is present in a second region forming the space using the position of the object within the second region forming the space using the position of the extracted object in the video and the estimated second region forming the space.

4. A detection method comprising:

estimating a position of an object in a target space using a video including the object;

constructing a plurality of learning models for recognizing the object;

managing a learning model associated with a first region, the object recognized in the learning model, and the estimated position of the object in association with each other;

estimating a second region of a space captured by a camera provided in a UI device;

selecting, from among the plurality of learning models, a specific learning model associated with the first region that is related to the second region; and detecting the object included in the second region using the selected specific learning model.

5. A non-transitory computer readable medium storing a program causing a computer to execute:

estimating a position of an object in a target space using a video including the object;

constructing a plurality of learning models for recognizing the object;

managing a learning model associated with a first region, the object recognized in the learning model, and the estimated position of the object in association with each other;

estimating a second region of a space captured by a camera provided in a UI device;

selecting, from among the plurality of learning models, a specific learning model associated with the first region that is related to the second region; and detecting the object included in the second region.

* * * * *